United States Patent [19]
Patterson et al.

[11] Patent Number: 5,037,912
[45] Date of Patent: Aug. 6, 1991

[54] POLYMERIZATION OF 1,3-BUTADIENE TO TRANS-1,4-POLYBUTADIENE WITH ORGANOLITHIUM AND ALKALI METAL ALKOXIDE

[75] Inventors: Dennis B. Patterson, La Jolla, Calif.; Adel F. Halasa, Bath, Ohio

[73] Assignee: The Goodyear Tire & Rubber Company, Akron, Ohio

[21] Appl. No.: 558,278

[22] Filed: Jul. 26, 1990

[51] Int. Cl.$^5$ .................... C08F 4/48; C08F 136/06
[52] U.S. Cl. ................... 526/174; 526/173; 526/335; 502/152; 502/154
[58] Field of Search ............ 526/174, 175, 181, 335, 526/173; 502/154, 157, 152

[56] References Cited

U.S. PATENT DOCUMENTS

| | | | |
|---|---|---|---|
| 3,285,894 | 11/1966 | Lim et al. | 526/175 |
| 3,356,754 | 12/1967 | Wofford | 502/157 X |
| 3,801,554 | 4/1974 | Selman | 526/175 |
| 4,794,145 | 12/1988 | Lund et al. | 525/250 |

OTHER PUBLICATIONS

Chemical Abstracts (76):26204p (1972).
Wofford et al., Copolymerization of Butadiene and Styrene by Initiation with Alkyllithium and Alkali Metal Tert-Butoxides, J. Poly. Sci. Pt. A-1, 1, 461-469, 1969.

Primary Examiner—Fred Teskin
Attorney, Agent, or Firm—Alvin T. Rockhill

[57] ABSTRACT

Trans-1,4-polybutadiene is a thermoplastic resin rather than a rubber at room temperature by virtue of its high degree of crystallinity. Because trans-1,4-polybutadiene contains many double bonds in its backbone, it can be blended and cocured with rubbers. It is accordingly an attractive alternative to conventional fillers such as carbon black, which are typically utilized in compounding rubber. By utilizing the catalyst system and techniques of this invention, trans-1,4-polybutadiene can be synthesized at a high level of conversion. This invention specifically relates to a process for the synthesis of trans-1,4-polybutadiene by an anoinic polymerization process which comprises: (a) adding an organolithium compound and an alkali metal alkoxide as a catalyst system to a polymerization medium containing 1,3-butadiene monomer and an organic solvent; and (b) allowing the 1,3-butadiene monomer to polymerize at a temperature which is within the range of about −10° C. to about 45° C. to produce the trans-1,4-polybutadiene.

16 Claims, No Drawings

POLYMERIZATION OF 1, 3-BUTADIENE TO TRANS-1,4-POLYBUTADIENE WITH ORGANOLITHIUM AND ALKALI METAL ALKOXIDE

BACKGROUND OF THE INVENTION

Trans-1,4-polybutadiene (TPBD) is a thermoplastic resin by virtue of its high level of crystallinity. Because it contains many double bonds in its polymeric backbone, it can be blended and cocured with rubber. TPBD is similar to syndiotactic-1,2-polybutadiene in this respect.

TPBD is normally prepared utilizing transition metal catalysts or rare earth catalysts. The synthesis of TPBD with transition metal catalysts is described by J. Boor Jr., "Ziegler-Natta Catalysts and Polymerizations", Academic Press, New York, 1979, Chapters 5-6. The synthesis of TPBD with rare earth catalysts is described by D. K. Jenkins, Polymer, 26, 147 (1985). However, molecular weight control is difficult to achieve with such transition metal or rare earth catalysts and monomer conversions are often very modest.

Better molecular weight control could be achieved by utilizing an anionic polymerization system to produce the TPBD. There is typically an inverse relationship between the catalyst level utilized and the molecular weight attained when anionic polymerization systems are used. Such an anionic polymerization system is disclosed in U.S. Pat. No. 4,225,690. The catalyst system disclosed therein is based on a dialkylmagnesium compound which is activated with a potassium alkoxide. However, only a minor amount of the polymer produced with such dialkyl magnesium based catalyst systems is TPBD. In other words, the small amount of TPBD produced utilizing such catalyst systems is always accompanied by major amounts of hexane-soluble polybutadiene of mixed microstructure.

SUMMARY OF THE INVENTION

The present invention relates to a technique for synthesizing TPBD at high levels of conversion by an anionic polymerization process. This anionic polymerization technique is attractive because molecular weight can be controlled by simply varying the catalyst level. It is also attractive because higher molecular weights can be obtained than can be reached utilizing typical coordination catalysts.

The subject invention discloses a catalyst system which can be utilized in the polymerization of 1,3-butadiene monomer into trans-1,4-polybutadiene, said catalyst system being comprised of an organolithium compound and an alkali metal alkoxide, wherein the molar ratio of the organolithium compound to the alkali metal alkoxide is within the range of about 2:3 to about 1:10.

The present invention further discloses a process for the synthesis of trans-1,4-polybutadiene by an anionic polymerization process which comprises polymerizing 1,3-butadiene monomer in an organic solvent at a temperature which is within the range of about −10° C. to about 45° C. in the presence of an organolithium compound and an alkali metal alkoxide.

The present invention more specifically relates to a process for the synthesis of trans-1,4-polybutadiene by an anionic polymerization process which comprises: (a) adding an organolithium compound and an alkali metal alkoxide as a catalyst system to a polymerization medium containing 1,3-butadiene monomer and an organic solvent: and (b) allowing the 1,3-butadiene monomer to polymerize at a temperature which is within the range of about −10° C. to about 50° C. to produce the trans-1,4-polybutadiene.

DETAILED DESCRIPTION OF THE INVENTION

The polymerizations of the present invention will normally be carried out in a hydrocarbon solvent which can be one or more aromatic, paraffinic, or cycloparaffinic compounds. These solvents will normally contain from 4 to 10 carbon atoms per molecule and will be liquids under the conditions of the polymerization. Some representative examples of suitable organic solvents include pentane, isooctane, cyclohexane, normal hexane, benzene, toluene, xylene, ethylbenzene, and the like, alone or in admixture. However, the catalyst systems of this invention can also be used in bulk polymerizations.

In the solution polymerizations of this invention, there will normally be from 5 to 35 weight percent monomers in the polymerization medium. Such polymerization media are, of course, comprised of the organic solvent and 1,3-butadiene monomer. In most cases, it will be preferred for the polymerization medium to contain from 10 to 30 weight percent monomers. It is generally more preferred for the polymerization medium to contain 20 to 25 weight percent monomer.

Polymerization is started by adding an organolithium compound and an alkali metal alkoxide to the polymerization medium. Such polymerizations can be carried out utilizing batch, semi-continuous, or continuous techniques. In a continuous process additional 1,3-butadiene monomer, catalyst, and solvent are continuously added to the reaction vessel being utilized. The polymerization temperature utilized will typically be within the range of about −10° C. to about 45° C. It is normally preferred for the polymerization medium to be maintained at a temperature which is within the range of about 0° C. to about 40° C. throughout the polymerization. It is typically most preferred for the polymerization temperature to be within the range of about 10° C. to about 30° C. The pressure used will normally be sufficient to maintain a substantially liquid phase under the conditions of the polymerization reaction.

The polymerization is conducted for a length of time sufficient to permit substantially complete polymerization of the 1,3-butadiene monomer. In other words, the polymerization is normally carried out until high conversions are realized. The polymerization can then be terminated using a standard procedure.

The organolithium compounds which can be utilized are normally organomonolithium compounds. The organolithium compounds which are preferred can be represented by the formula: R-Li, wherein R represents a hydrocarbyl radical containing from 1 to about 20 carbon atoms. Generally, such monofunctional organolithium compounds will contain from 1 to about 10 carbon atoms. Some representative examples of organolithium compounds which can be employed include methyllithium, ethyllithium, isopropyllithium, n-butyllithium, sec-butyllithium, n-octyllithium, tert-octyllithium, n-decyllithium, phenyllithium, 1-naphthyllithium, 4-butylphenyllithium, p-tolyllithium, 4- phenylbutyllithium, cyclohexyllithium, 4-butylcyclohexyllithium, and 4-cycohexylbutyllithium.

As a general rule, from about 0.1 to about 2 mmoles per 100 grams of butadiene monomer of the organolithium compound will be utilized. It is normally preferred for the organolithium compound to be present in an amount which is within the range of 0.2 to 1.5 mmoles per 100 grams of 1,3-butadiene. Amounts in the range of about 0.5 to about 1.0 mmoles per 100 grams of monomer are most preferred.

The alkali metal alkoxide will typically contain from about 2 to about 12 carbon atoms. It is generally preferred for the alkali metal alkoxide to contain from about 3 to about 8 carbon atoms. It is generally most preferred for the alkali metal alkoxide to contain from about 4 to about 6 carbon atoms. Potassium t-amyloxide (potassium t-pentoxide) is a highly preferred alkali metal alkoxide which can be utilized in the catalyst systems of this invention.

In the catalyst systems of this invention, the molar ratio of the organolithium compound to the alkali metal alkoxide will typically be within the range of about 2:3 to about 1:10. It is generally preferred for the molar ratio of the organolithium compound to the alkyl metal alkoxide to be within the range of about 1:2 to about 1:8. Molar ratios within the range of about 1:3 to about 1:6 are most preferred. The amount of catalyst employed will be dependent upon the molecular weight which is desired for the TPBD being synthesized. As a general rule with all anionic polymerizations, the molecular weight of the polymer produced is inversely proportional to the amount of catalyst utilized.

In the TPBD produced by the process of this invention, at least 75% of the butadiene repeat units in the polymer are of the trans-1,4-isomeric structure. The TPBD made utilizing the catalyst system of this invention typically has a trans-isomer content of about 80% to about 95%. The TPBD produced has two distinct melting points. The first melting point is within the range of about 60° C. to about 80° C. and the second melting point is within the range of about 135° C. to about 155° C.

This invention is illustrated by the following examples which are merely for the purpose of illustration and are not be regarded as limiting the scope of the invention or the manner in which it can be practiced. Unless specifically indicated otherwise, all parts and percentages are given by weight.

EXAMPLES 1-3

A series of dry, nitrogen-filled 32 ounce (946 ml) septum sealed screw cap bottles were charged with 800 ml of an 18.9% solution of butadiene in mixed hexanes. These solutions had been passed several times over mixed silica/alumina under a nitrogen atmosphere. A 0.89M solution of potassium t-amyloxide in cyclohexane (obtained from Callery Chemical Company and treated with potassium metal) was injected into each of the bottles with a syringe. Then, 0.5 mmoles of a 2.5M solution of n-butyllithium in hexane was injected into each of the bottles. The molar ratio of the n-butyllithium to the potassium t-amyloxide used in each of the polymerizations is shown in Table I.

The bottles were maintained at a temperature of 10° C. and mechanically shaken for a polymerization time of at least 18 hours. The polymerizations were then shortstopped by injecting 10 ml of methanol and 15 ml of a 5% W/V solution of butylated hydroxytoluene (BHT) in hexane into the bottles. The TPBD produced was then strained off and washed several times with hexane, the final wash (with soaking) being with a 1% solution of BHT in hexane.

TABLE I

| Example | n-butyllithium/potassium t-amyloxide (molar ratio) | TPBD Yield | Soluble Polymer Yield |
| --- | --- | --- | --- |
| 1 | 1:2 | 93% | 3% |
| 2 | 1:3 | 98% | 2% |
| 3 | 1:6 | 80% | 20% |

The TPBD synthesized in these experiments was determined to have melting points at about 67° C. and 151° C., which means that it had a very high trans-1,4 content. A small amount of soluble polymer (medium vinyl polybutadiene) was also produced by these polymerizations. As can be seen, a maximum yield of TPBD was realized at a n-butyllithium to potassium t-amyloxide molar ratio of 1:3. As the molar ratio of the organolithium compound to the alkali metal alkoxide was reduced to 1:6, the amount of medium vinyl polybutadiene produced increased to 20%. In Example 2 where the ratio of n-butyllithium to potassium t-amyloxide was 1:3, the TPBD yield attained was 98% with only 2% of the soluble polymer being produced. This series of experiments clearly shows that by utilizing the catalyst system of this invention that TPBD can be synthesized in high purity and at high yields.

EXAMPLE 4

The procedure of Example 3 was repeated in this experiment except for the polymerization being allowed to exotherm (by not being placed in a cooling bath). The TPBD yield attained was 89%. The TPBD produced had melting points at 68° C. and 150° C.

EXAMPLES 5-7

The general procedure described in Examples 1-3 was repeated in this series of experiments with the level of the potassium t-amyloxide being reduced as shown in Table II.

TABLE II

| Example | n-butyllithium/potassium t-amyloxide (molar ratio) | TPBD Yield | Soluble Polymer Yield |
| --- | --- | --- | --- |
| 5 | 1:2 | 38% | 64% |
| 6 | 1:1.8 | 45% | 58% |
| 7 | 1:1.6 | 69% | 30% |

COMPARATIVE EXAMPLE 8

The procedure described in Example 3 was repeated in this experiment except for the polymerization temperature being increased to 50° C. The yield of TPBD was reduced to about 10% with most of the polymer produced being medium-vinyl polybutadiene. This experiment shows that it is important to keep the polymerization temperature below about 50° C.

COMPARATIVE EXAMPLES 9-10

In these experiments, the level of potassium t-amyloxide was reduced to a very low level with the general procedure described in Examples 1-3 being utilized. The level of potassium t-amyloxide employed is shown in Table III.

TABLE III

| Example | n-butyllithium/potassium t-amyloxide (molar ratio) | TPBD Yield | Soluble Polymer Yield |
| --- | --- | --- | --- |
| 9 | 1:1.4 | 25% | 68% |
| 10 | 1:1.3 | 0% | 100% |

As can be seen, when the ratio of n-butyllithium to potassium t-amyloxide was increased to greater than about 2:3, yields were very poor. In Example 10, the polymerization resulted in the formation of only medium-vinyl polybutadiene.

While certain representative embodiments and details have been shown for the purpose of illustrating the present invention, it will be apparent to those skilled in this art that various changes and modifications can be made therein without departing from the scope of the present invention.

What is claimed is:

1. A process for the synthesis of trans-1,4-polybutadiene by an anionic polymerization process which comprises polymerizing 1,3-butadiene monomer in an organic solvent at a temperature which is within the range of about −10° C. to about 45° C. in the presence of an organolithium compound and an alkali metal alkoxide, wherein the molar ratio of the organolithium compound to the alkali metal alkoxide is within the range of about 2:3 to about 1:10, wherein the alkali metal in the alkali metal alkoxide is selected from the group consisting of potassium, rubidium and cesium; wherein the 1,3-butadiene monomer is polymerized into trans-1,4-polybutadiene having a trans-isomer content of about 80% to about 95%; and wherein the trans-1,4-polybutadiene has a first melting point which is within the range of about 60° C. to about 80° C. and a second melting point which is within the range of about 135° C. to about 155° C.

2. A process as specified in claim 1 wherein the polymerization is carried out at a temperature which is within the range of about 0° C. to about 40° C.

3. A process as specified in claim 1 wherein the molar ratio of the organolithium compound to the alkali metal alkoxide is within the range of about 1:2 to about 1:8.

4. A process as specified in claim 3 wherein the organolithium compound is an alkyllithium compound.

5. A process as specified in claim 2 wherein the alkali metal alkoxide is potassium t-pentoxide.

6. A process for the synthesis of trans-1,4-polybutadiene by an anionic polymerization process which comprises: (a) adding an organolithium compound and an alkali metal alkoxide as a catalyst system to a polymerization medium containing 1,3-butadiene monomer and an organic solvent, wherein the alkali metal in the alkali metal alkoxide is selected from the group consisting of potassium, rubidium and cesium; wherein the molar ratio of the organolithium compound to the alkali metal alkoxide is within the range of about 2:3 to about 1:10; and (b) allowing the 1,3-butadiene monomer to polymerize at a temperature which is within the range of about −10° C. to about 45° C. to produce the trans-1,4-polybutadiene having a trans-isomer content of about 80% to about 95%; and wherein the trans-1,4-polybutadiene has a first melting point which is within the range of about 60° C. to about 80° C. and a second melting point which is within the range of about 135° C. to about 155° C.

7. A process as specified in claim 6 wherein the polymerization is conducted at a temperature which is within the range of about 0° C. to about 40° C.

8. A process as specified in claim 7 wherein the polymerization is conducted at a temperature which is within the range of about 10° C. to about 30° C.

9. A process as specified in claim 8 wherein the alkali metal alkoxide is potassium t-pentoxide.

10. A process as specified in claim 6 wherein the organolithium compound is an alkyllithium compound.

11. A process as specified in claim 10 wherein the molar ratio of the organolithium compound to the alkali metal alkoxide is within the range of about 1:2 to about 1:8.

12. A process as specified in claim 11 wherein the alkyl groups in the alkyllithium compound contain from about 4 to about 8 carbon atoms.

13. A process as specified in claim 12 wherein the alkali metal alkoxide contains from about 4 to about 6 carbon atoms.

14. A process as specified in claim 11 wherein the alkali metal alkoxide is potassium t-pentoxide.

15. A process as specified in claim 14 wherein the alkyllithium compound is n-butyllithium.

16. A process as specified in claim 13 wherein the molar ratio of the alkyllithium compound to the alkali metal alkoxide is within the rage of about 1:3 to about 1:6.

* * * * *